United States Patent [19]
Cumberlege

[11] Patent Number: 5,911,304
[45] Date of Patent: Jun. 15, 1999

[54] CONVEYOR TRACKING IDLER

[75] Inventor: John Pear Cumberlege, Port Elizabeth, South Africa

[73] Assignee: Alucais Inc., Tortola, Virgin Islands (Br.)

[21] Appl. No.: 08/809,181

[22] PCT Filed: Sep. 20, 1995

[86] PCT No.: PCT/AU95/00618

§ 371 Date: May 19, 1997

§ 102(e) Date: May 19, 1997

[87] PCT Pub. No.: WO96/09237

PCT Pub. Date: Mar. 28, 1996

[30] Foreign Application Priority Data

Sep. 20, 1994 [ZA] South Africa .......................... 94/7265

[51] Int. Cl.⁶ .................................................. B65G 39/16
[52] U.S. Cl. .......................................................... 198/806
[58] Field of Search ...................................... 198/806, 808

[56] References Cited

U.S. PATENT DOCUMENTS

| | | | |
|---|---|---|---|
| 1,833,180 | 11/1931 | Robins | 198/806 |
| 2,330,923 | 10/1943 | Robins . | |
| 2,655,251 | 10/1953 | Bankauf | 198/806 |
| 4,552,295 | 11/1985 | Smith et al. | 198/806 |

FOREIGN PATENT DOCUMENTS

| | | |
|---|---|---|
| 172027 A1 | 2/1986 | European Pat. Off. . |
| 899622 | 12/1953 | Germany . |
| 3505132 A1 | 8/1986 | Germany . |
| 3543255 A1 | 6/1987 | Germany . |
| 763210 | 9/1980 | U.S.S.R. . |

*Primary Examiner*—William E. Terrell
*Assistant Examiner*—Khoi H. Tran
*Attorney, Agent, or Firm*—Birch, Stewart, Kolasch & Birch, LLP

[57] ABSTRACT

A training idler for guiding a travelling conveyor belt so that the belt follows a central path. The training idler includes an axle adapted to be mounted to a conveyor support frame, a steering roller rotatably mounted on the axle and adapted to be aligned generally transverse to a conveyor belt which will ride thereon, and a pivot connecting the roller to the axle, the pivot defining a generally perpendicular pivot axis about which the steering roller is able to pivot. The steering roller has an outer peripheral surface of generally right circular cylindrical form and has a central region and opposite edge regions, the edge regions having a peripheral circumference which is either greater than or less than the peripheral circumference of the central region. The arrangement is such that, in use, as a conveyor belt riding on the steering roller moves towards one or other edge region, the difference in the peripheral speeds of the central region and that edge region will cause the steering roller to pivot on the pivot axis and steer the belt back to its central path.

13 Claims, 4 Drawing Sheets

CONVEYOR TRACKING IDLER

BACKGROUND TO THE INVENTION

THIS invention relates to a training idler for guiding a travelling conveyor belt as the belt runs along its intended path.

It is well known that conveyor belts tend to drift or creep sideways as they travel along their intended paths. This problem is exacerbated when the belt is particularly long, carries high load, or is a particularly heavy belt. When setting up the belt it is known practice to adjust the alignment of either the drive roller or return roller, or both, to try and achieve central tracking of the belt. However, the belt will often tend to shift laterally at some intermediate point along its length which can cause damage to the edge of the belt or to the support frame.

Also, in use, a belt that has originally been set up to track centrally may, after time, begin to move laterally due to belt stretch, high load situations, or deposits on the rollers. For this reason it is standard practice to have an operator continuously adjusting the angle of the drive or return roller to try and achieve central tracking of the belt. High cost automatic pneumatic or hydraulic adjustors are known, but these are not always appropriate to use, particularly in high load mining operations.

To avoid this continual adjustment it is also known to install tracking rollers, which are also known as training idlers, along the length of the conveyor which will automatically slew about a vertical axis as the belt moves out of alignment to steer the belt back to its central path. US Pat. Nos. 1,510,051, 1,628,614, and 2,725,757 depict examples of known tracking rollers. Each of the tracking rollers depicted in those patents have an upwardly extending guide roller located on opposite edges of the belt. As the belt moves laterally to one or other side the edge of the belt will contact the guide roller on that side which, in turn, will cause pivoting of the training idler to cause the aforementioned pivoting or stewing of the training idler. As the training idler slews out of transverse alignment with the belt it will tend to steer the belt back to its central path whereafter the belt will again run centrally along its intended path.

Various problems are associated with this type of training idler. For example, it is found that the edge of the belt contacting the guide roller tends to place a considerable strain on the guide roller causing damage to the guide roller and the edge of the belt. Also, this type of training idler requires space in which to maneuver so frequently they are inappropriate for installation as a replacement for a standard idler. Thus, if in a particular conveyor it is found that the belt begins to drift at some or other position along the length of the belt it is often necessary to make significant changes to the support frame at the location where it is desired to install a training idler.

It is desirable that where a training idler is to be installed, this can be done with minimum interruption to the operation where the belt is located. It is also desirable that the training idler is relatively inexpensive and uncomplicated so that no special maintenance or skilled operator is required to install and maintain the training idler.

SUMMARY OF THE INVENTION

According to the invention there is provided a training idler for guiding a travelling conveyor belt so that the belt follows a central path, the training idler comprising:

support means adapted to be mounted to a conveyor support frame;

a steering roller rotatably mounted on the support means and adapted to be aligned generally transverse to a conveyor belt which will ride thereon;

pivot means connecting the roller to the support means, said pivot means defining a generally perpendicular pivot axis about which the steering roller is able to pivot;

said steering roller having an outer peripheral surface of generally right circular cylindrical form and having a central region and opposite edge regions, said edge regions having a peripheral circumference which is either greater than or less than the peripheral circumference of the central region;

the arrangement being such that, in use, as a conveyor belt riding on said steering roller moves towards one or other edge region, the difference in the peripheral speeds of the central region and that edge region will cause the steering roller to pivot on the pivot axis and steer the belt back to its central path.

The pivot means is preferably located within the steering roller and is supported on an axle which passes through the steering roller to extend through opposite ends thereof. The opposite ends of the axle will preferably be configured to slot into standard idler supports.

The pivot axis preferably intersects with the rotational axis of the steering roller. The steering roller may comprise an outer hollow cylindrical sleeve which is internally mounted via bearings to the pivot.

The end regions of the steering roller may taper either convergently or divergently in an outward direction from the central region. Where the end regions of the steering roller are of larger peripheral diameter than the central region, the trainer will preferably include slip means adjacent to each end region which is adapted to keep the conveyor belt out of contact with the respective end regions when the belt is centrally located on the steering roller.

These and further features of the invention will be made apparent from the description of preferred embodiments thereof given below by way of example. In the description reference is made to the accompanying drawings which depict various examples of the invention. It should be noted that the specific features shown should not be construed as limiting on the invention.

DETAILED DESCRIPTION OF EMBODIMENTS

Figure 1:
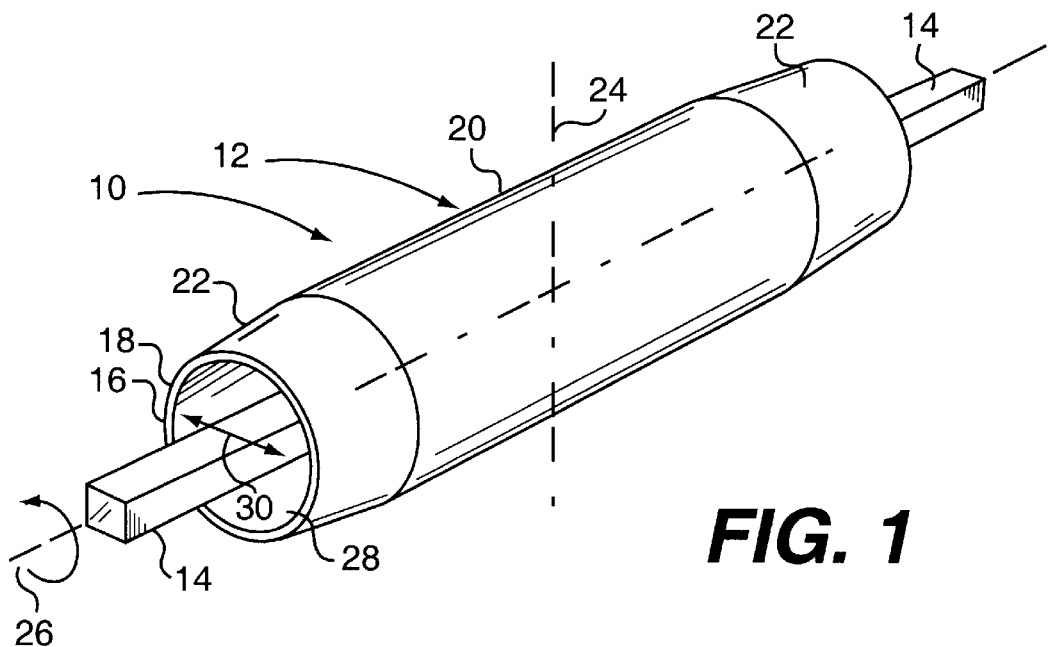
FIG. 1 depicts a perspective view of a training idler according to the invention.

Turning initially to FIG. 1, a training idler 10 according to the invention comprises a steering roller which is rotatably mounted on an axle 14, the ends 16 of the axle extending beyond the outer end 18 of the steering roller. The axle 14 is intended to be mounted to a support frame for the conveyor belt assembly. The steering roller 12 is preferably made from or covered with a long wearing non-slip material.

The steering roller 12 includes a central region 20 which is right circular cylindrical in form and extends for approximately ¾ of the length of the steering roller 12. On each end of the central region 20 is an end region indicated at numeral 22. The end regions 22 both taper convergently away from the central region at an angle of between 0.5° and 5°, preferably about 1°.

The steering roller 12 is pivotable about a vertical pivoted axis indicated at numeral 24 relative to the axle 14. The steering roller 12 is rotatable relative to the axle 14 about rotational axis 26. The steering roller 12 is hollow so that pivoting about the pivot axis 24 is limited by the free space between the inside 28 of the steering roller and the axle 14. The extent of the movement of the steering roller 12 relative to the axle 14 about its pivot axis 24 is indicated by arrow 30.

Figure 2:
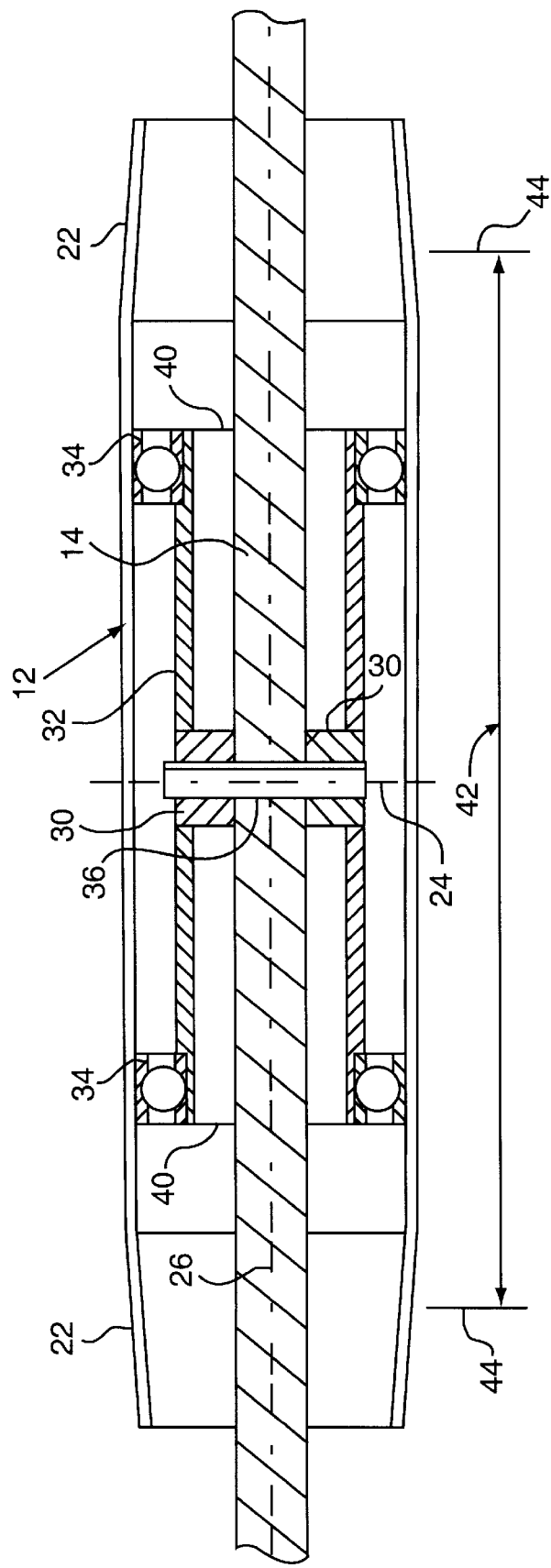
FIG. 2 shows a cross-sectional side view through the training idler of the type depicted in FIG. 1.

The internal arrangement of the training idler is depicted in FIG. 2 of the drawings. As shown, the steering roller 12 is supported on an internal sleeve 32 by means of a pair of bearings 34 spaced apart on opposite sides of the pivot axis 24. A pivot pin 36 connects the internal sleeve 32 with the axle 14 through a pair of bearings 38 which allow for the pivoting movement. Contact of the ends 40 of the internal sleeve 32 against the axle 14 will limit the extent to which the steering roller 12 is able to pivot about pivot axis 24.

The belt width for use with a training idler 10 of the type depicted is indicated by dimension line 42. It will be noted that the edges of the belt will be in-contact with the end regions 22 of the steering roller 12 but the steering roller 12 will extend beyond the edges 44 of the belt.

Figure 3:
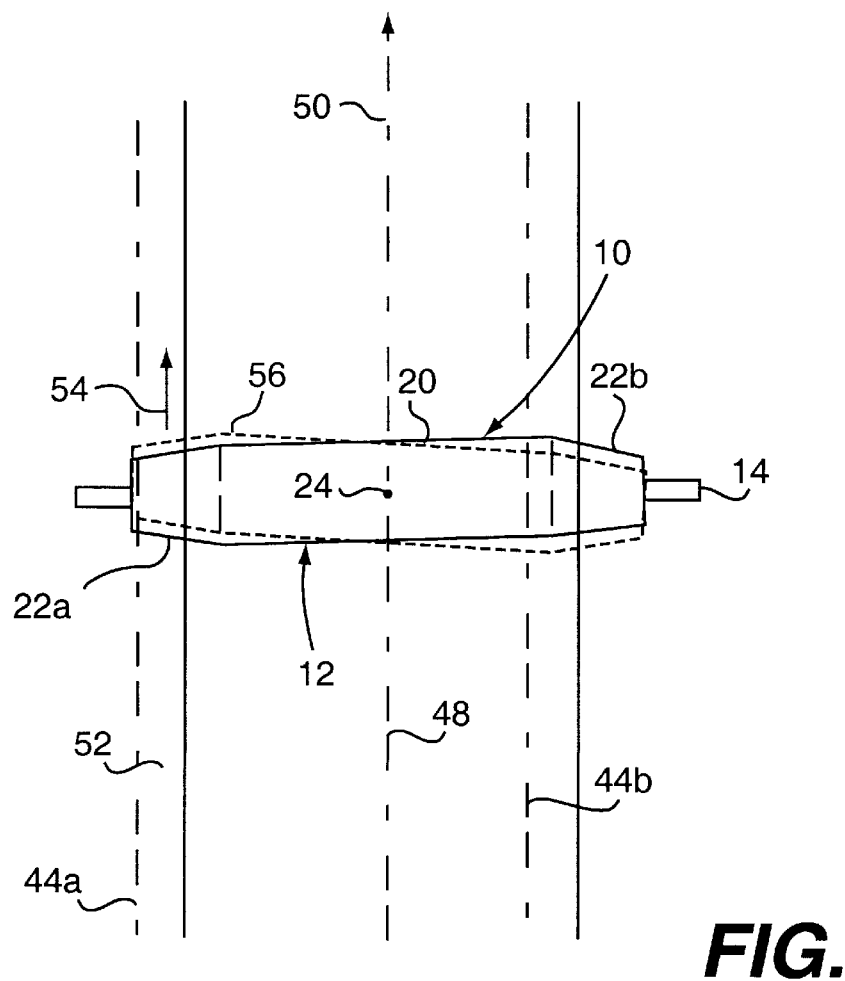
FIG. 3 shows a plan view of a conveyor belt with a training idler controlling the position of the belt.

The manner in which the training idler 10 will control the position of the belt can clearly be understood with reference to FIG. 3 of the drawings. The belt 46 is arranged to travel along a path the center of which is indicated by dotted line 48. The belt moves in the direction of arrow 50. As the belt 46 moves off its central path 48, as indicated by dotted lines 52, the left hand edge of the belt (indicated by numeral 44a) will begin to move down the end region 22a. The right hand edge 44b will, simultaneously, move off the right hand end region 22b. It will be appreciated that because of the tapered form of the end region 22a the peripheral speed of the end region 22a at the point where the edge of the belt 44a contacts the end region 22a will have a peripheral speed which is slower than the peripheral speed of the central region 20. The effect of this will be that the belt will tend to drag the end region 22a forwardly, that is in the direction of arrow 54. Since the steering roller 12 is able to pivot about the pivot axis 24 the effect of the drag 54 on the one end of the steering roller 12 will tend to slew the steering roller 12 to the position indicated by dotted lines 56. It will be appreciated that this slewed roller will tend to steer the belt 46 back towards its central path 48 until such time as the edge 44b begins to move down the tapered end region 22b. The steering roller 12 will then again align itself perpendicularly with the path 48. Thus, the slewing action will be automatic and no separate controlling mechanism or other device will be required in order to steer the belt 46. It will be appreciated that no lateral guide rollers or other devices are required to cause a slewing motion of the steering roller 12 and thus no undue load will be placed on any component in the system. The only load will be that occasioned by the belt being in contact with parts of the steering roller travelling at different peripheral speeds which tend to cause the slewing motion of the training idler. There will of course, be a slight shear load on the belt itself. It will be envisaged that this load will not be sufficient to in any way damage a conventional belt.

Figure 4:
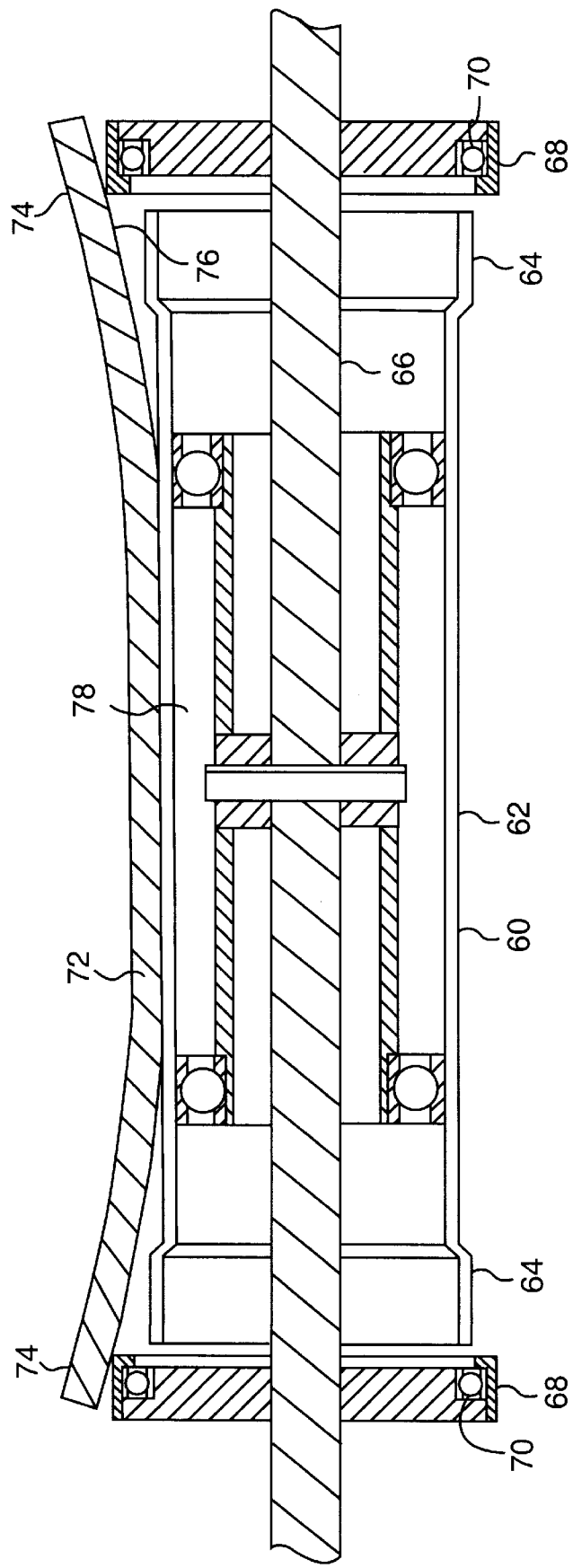
FIGS. 4 & 5 depict cross-sectional side views of two alternative embodiments of the invention.

The training idler depicted in FIG. 4 of the drawings is similar to that depicted in FIGS. 1 to 3 but operates in the reverse to that of the previous embodiment. It will be noted that the support arrangement is the same as that of the previous embodiment and will not therefor be described again. The steering roller 60 includes a central region 62 and end regions 64 which are of a greater diameter than central region 62. Located outwardly of the steering roller 60 but supported on the axle 66 are a pair of skid rollers 68 which are of greater diameter than the end regions 64. The skid rollers 68 are rotationally supported via bearings 70 on the axle 66 so that skid rollers 68 are able to rotate at a rotational speed which is less than that of the steering roller 60.

In normal operation the belt 72 will run with the edges 74 thereof running on the skid rollers 68. In this condition the peripheral speeds of the central region and skid rollers will be the same. Should the belt 72 begin to drift towards one or other side of the steering roller 60, the edge 74 on the opposite side of the steering roller 60 will move off its skid roller 68. The underside 76 of the belt will then come into contact with the end region 64 of the steering roller 60. Since the edge region 64 is travelling at a peripheral speed which is faster than the central region 62 the effect will be to pivot the steering roller 60 about its pivot axis 78 in a manner similar to that shown in FIG. 3 and thereby steer the belt 72 back into its central position as shown in FIG. 4. Thus, it is the side of the belt away from which the belt is moved which comes into contact with the larger diameter end region 64 and which will cause slewing of the steering roller 60 and the return of the belt to its central position.

Figure 5:
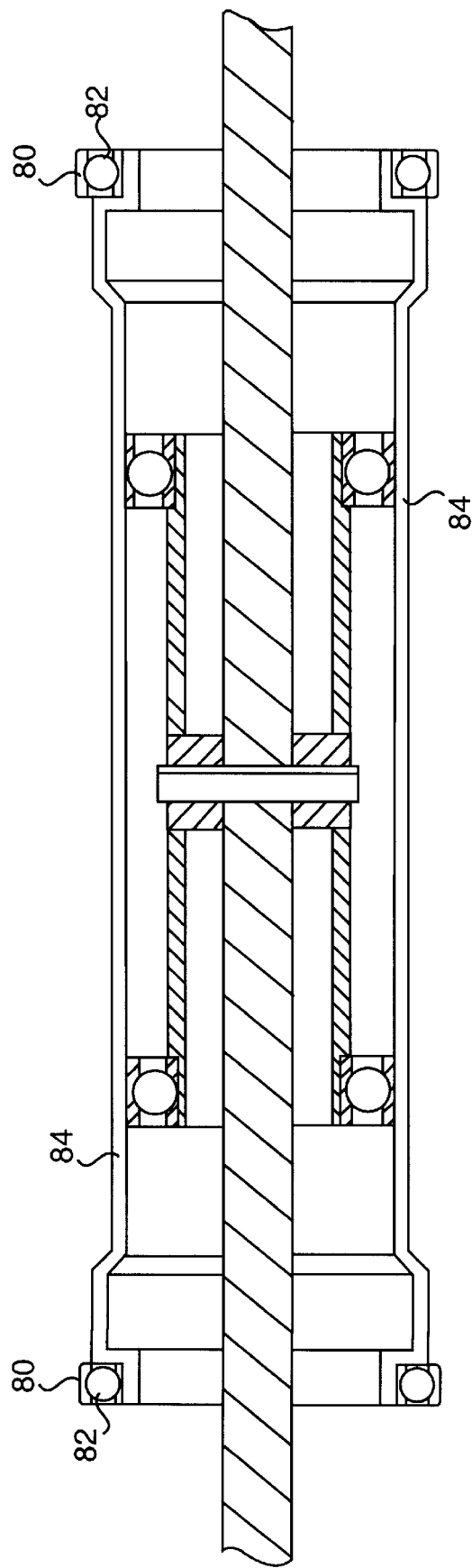

The embodiment shown in FIG. 5 is similar to that of FIG. 4 except that the skid rollers 80 are shown mounted via bearings 82 to the steering roller 84. In other respects it will operate in the same manner as described above with reference to FIG. 4.

I claim:

1. A training idler for guiding a travelling conveyor belt so that the belt follows a central path, the training idler comprising:

a support axle adapted to be mounted to a conveyor support frame;

a steering roller in the form of an outer hollow generally cylindrical sleeve rotatably mounted on the support axle so as to be rotatable about a rotational axis which is coincident with the support axle and adapted to be aligned generally transverse to a conveyor belt which will ride thereon;

pivot means connecting the roller to the support axle, said pivot means being located within the steering roller and defining a pivot axis which is generally perpendicular to the belt and about which the steering roller is able to pivot, the pivot axis intersecting the rotational axis of the steering roller; said steering roller having an outer peripheral surface of generally right circular cylindrical form and having a central region and opposite edge regions, said edge regions having a peripheral circumference which is either greater than or less than the peripheral circumference of the central region; and bearing means being located within the outer sleeve which connects the outer sleeve to the pivot means, said bearing means comprising a pair of bearings spaced apart on opposite sides of the pivot axis, and an inner hollow sleeve through which the axle passes, the bearings rotationally supporting the outer sleeve from the internal sleeve, the pivot means connecting the inner sleeve to the axle; the arrangement being such that, in use, as a conveyor belt riding on said steering roller moves towards one or other edge region, the belt travelling over two regions of the roller travelling at different peripheral speeds will impart a force to the steering roller which will cause the steering roller to pivot about the pivot axis and steer the belt back to a central position.

2. A training idler according to claim 1 wherein the pivot means comprises a pin located centrally within and supported by diametrically opposite sides of the internal sleeve, the pin being connected at its centre to the axle.

3. A training idler according to claim 1 wherein the opposite end regions of the steering roller have a lesser peripheral diameter than the central region.

4. A training idler according to claim 3 wherein the end regions taper convergently in a direction away from the central region.

5. A training idler according to claim 4 wherein the angle of taper is between 0.5° and 5°.

6. A training idler according to claim 3 wherein each edge region has a length of between one quarter and one eighth of the length of the steering roller.

7. A training idler according to claim 6 wherein each edge region has a length of approximately one sixth of the length of the steering roller.

8. A training idler according to claim 1 wherein the opposite end regions of the steering roller have a greater peripheral diameter than that of the central region, and the training idler includes slip means adjacent each end region adapted to keep the conveyor belt out of contact with the respective end regions when the belt is centrally located on the steering roller.

9. A training idler according to claim 8 wherein the slip means is located outwards of the respective end regions.

10. A training idler according to claim 8 wherein each slip means comprises a slip ring having a greater peripheral diameter than said end regions, said slip ring being coaxially mounted with said steering roller and being rotatable relative to said steering roller.

11. A training idler according to claim 10 wherein the slip ring is mounted via a bearing to the steering roller.

12. A training idler according to claim 10 wherein the slip ring is mounted to the support axle independently of the steering roller.

13. A training idler according to claim 1 wherein the internal sleeve has ends and a length which is substantially greater than the diameter of said roller in order to limit movement of said roller about said pivot axis.

\* \* \* \* \*